INVENTOR
H. E. JACKSON
BY
Holcombe, Wetherill & Brisebois
ATTORNEYS

INVENTOR
H. E. JACKSON
BY
Holcombe, Wetherill - Brisebois
ATTORNEYS

June 6, 1967  H. E. JACKSON  3,323,581
THERMOSTATIC HEATER

Filed March 22, 1965  3 Sheets-Sheet 3

INVENTOR
H. E. JACKSON
BY
Holcombe, Wetherill & Bruebois

ATTORNEYS

United States Patent Office 3,323,581
Patented June 6, 1967

3,323,581
THERMOSTATIC HEATER
Harold E. Jackson, Devon, England, assignor to Petrol Injection Limited, Devon, England, a British company
Filed Mar. 22, 1965, Ser. No. 441,787
Claims priority, application Great Britain, Mar. 26, 1964, 12,935/64
6 Claims. (Cl. 165—40)

This invention relates to thermostatically controlled fan assisted heaters. In particular, it relates to fan assisted heaters in which operation of the fan is thermostatically controlled.

In certain space heating arrangements, air from the space to be heated is drawn by a fan over a heat exchanger and then passed back into the space. With the object of maintaining a constant desired temperature in the space, such arrangements may be thermostatically controlled. To this end a thermally responsive device can be located adjacent the air intake of the heater so that it is exposed to incoming air from the space. When the thermally responsive device reaches a predetermined temperature, it operates to switch off the fan. When the space temperature has dropped sufficiently so that the thermally responsive device reaches a predetermined lower temperature, it operates to operate the fan again. A disadvantage of this arrangement is that after the fan has stopped, the local ambient temperature of the thermally responsive device tends to rise due to conduction, radiation and convection from the heat exchanger and this can result in operation of the thermally responsive device lagging temperature changes of the space being heated so that variations in the space temperature are markedly greater than the nominal operating differential of the thermally responsive device.

According to the present invention, a fan assisted heat exchanger in which operation of the fan is thermostatically controlled, includes a thermally responsive device located adjacent the air intake of the heater, and including a heating device for the thermostatic switch device disposed in proximity thereto and connected for operation only during operation of the fan to compensate cooling of the thermostatic switch device by fan induced air intake into the heater.

In a particular embodiment of the invention used to heat a room, an electric fan draws air from the room and passes it over fluid heated heat exchanger elements, the heated air then being returned to the room. The operation of the fan, and of an auxiliary heating element located adjacent thereto, is controlled by a thermostatic switch located in front of the fan. When the fan and auxiliary heating element are off, the thermostatic switch temperature rises above that of the room due to conduction, radiation and convection from the heat exchanger and with the fan on, the temperature of the switch tends to fall, due to the lower temperature incoming air from the room, but the heating element output is arranged to provide compensation for this drop. By setting the thermostat at a temperature greater, by an amount equal to the temperature rise imparted to the thermostatic switch by the heating element, than the desired room temperature, the arrangement according to the invention can be made to control the room temperature within the range of its operating differential and with minimum lag.

In a particular example, using a thermostat switch having an operating differential of 1° F., it was found that in controlling a room temperature at 70° F., when the fan was switched off the local ambient temperature of the thermostatic switch rose by 3° F. The heating element was arranged to impart a similar temperature increase when the fan was on and by setting the thermostat to operate at a temperature of 72° F., the room temperature was maintained at a temperature within the range 69° F. to 70° F. This compares with a similar arrangement excluding the auxiliary heating element and setting the thermostatic switch to operate at 69° F., in which it was found, due to the uncompensated rise in local ambient temperature of the switch when the fan was off, the room temperature could drop to the region of 66° F. before the temperature of the thermostatic switch fell to 69° F. In that case, although the thermostatic switch had an operating differential of 1° F., the room temperature could vary by 4° F.

In apparatus according to the invention, the auxiliary heating device may surround the thermally responsive device or be located closely adjacent thereto. The heat exchanger elements may be water or gaseous fluid heated elements.

By way of example, an embodiment of the invention will be described in greater detail with reference to the accompanying drawings, in which.

Figure 1:
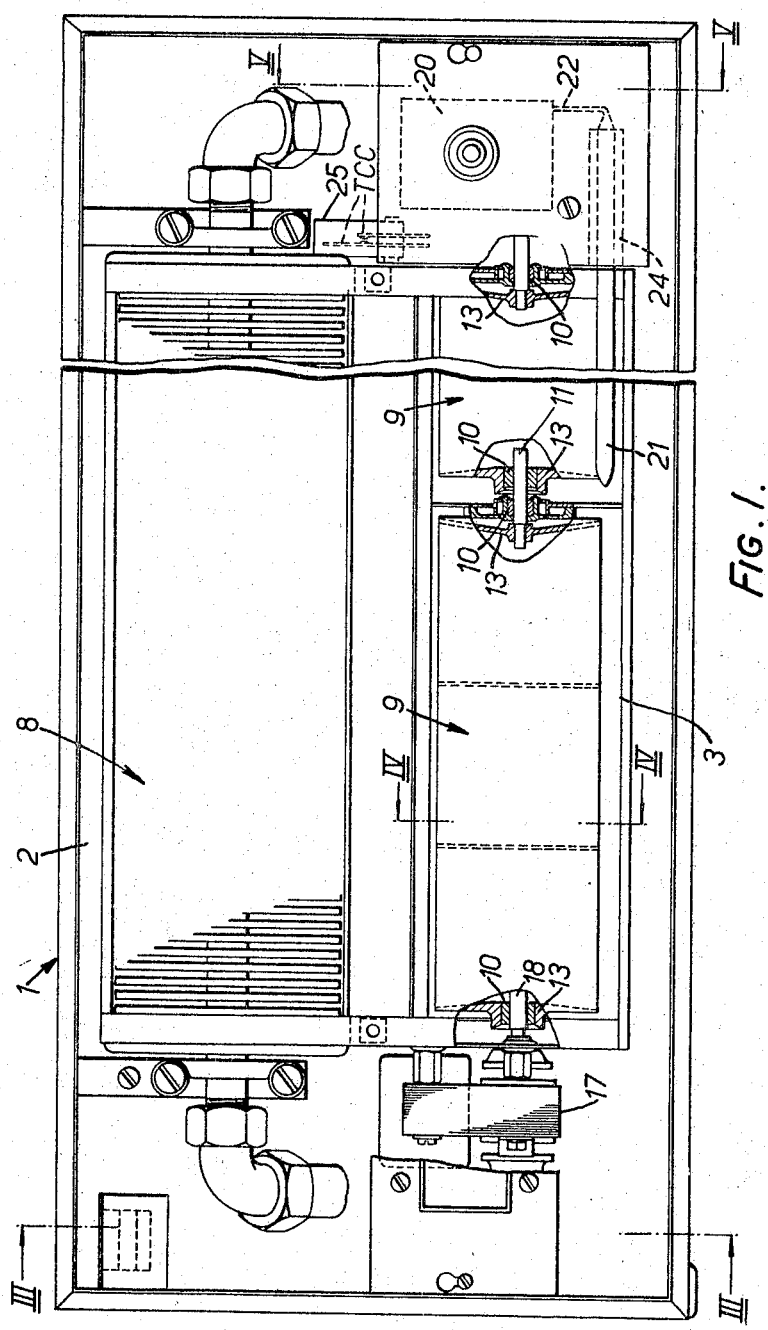
FIG. 1 is a frontal elevation of the heater with the front cover removed.
Figure 2:
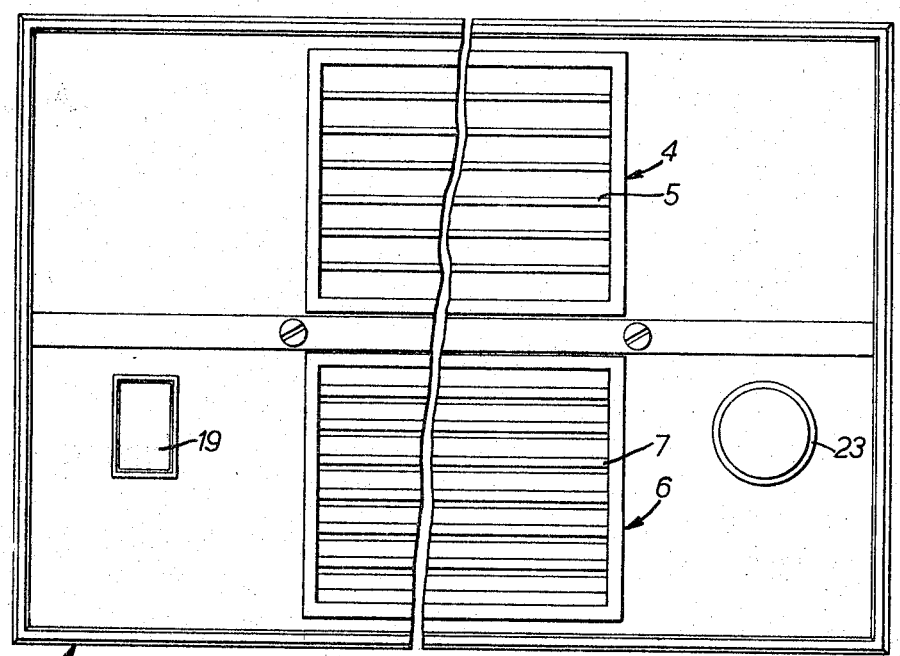
FIG. 2 is a view similar to FIG. 1 but with the front cover in place.
Figure 3:
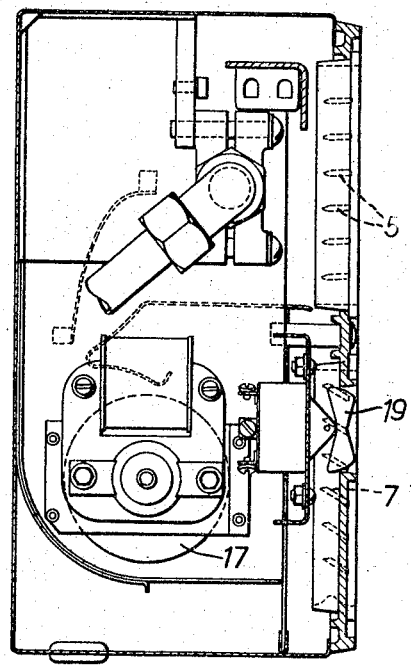
FIG. 3 is a section on the line III—III in FIG. 1.
Figure 4:
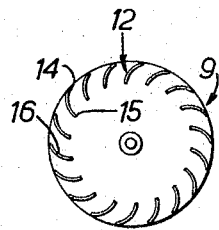
FIG. 4 is a section on the line IV—IV of FIG. 1.
Figure 5:
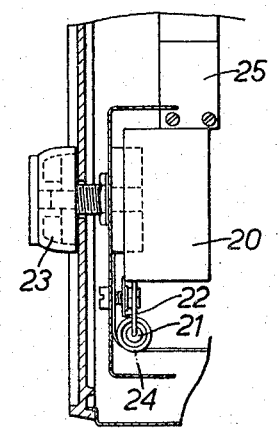
FIG. 5 is a part section on the line V—V of FIG. 1.

The apparatus illustrated is suitable for incorporation into a small-bore hot water central heating system to circulate and heat air in a room or other space in which the apparatus is located.

The apparatus comprises an elongated housing 1, of generally rectangular construction, having an upper compartment 2 intercommunicating with a lower compartment 3. At the front of the housing 1, the upper compartment 2 has an air outlet 4 provided with louvres 5 and the lower compartment 3 has an air intake 6 provided with louvres 7.

Within the upper compartment 2 is disposed a fluid heat exchanger 8 in the form of a radially finned tube, through which hot water is circulated to provide a heat source, extending along the upper compartment. In use of the heater, the heat exchanger 8 is connected in the plumbing of a forced circulation central heating installation.

The lower compartment contains a pair of transverse flow fan cylinders 9 extending along the length of the air intake 6. The fans 9 are rotatably mounted in bearings 10 and interconnected by a shaft 11 so that the fans can rotate as a common unit.

The fan cylinders 9 are bladed rotors having blades 12 extending between end discs 13, which close the ends of the cylinders 9. The blades 12 have outer edges 14 leading their inner edges 15 and each presents a concave leading face 16. In operation of these fans, air is directed from the air intake 6 to the outlet 4, passing at least twice through the rotor blades 12 at all times in a direction transversely of the rotor axis.

In a space at one end of the housing 1, there is disposed an electric induction motor 17 drivably coupled to the fan cylinders 9 via a stub shaft 18. The motor 17 can be operated at either of two speeds under control of a switch 19.

In a space at the other end of the housing 1, there is disposed an adjustable electric thermostat 20 having a temperature sensing element 21 in the form of a tube extending along the front of one of the fan cylinders 9 so that it is exposed to air drawn through the air intake 6 during rotation of the fan cylinders 9. The tube 21 contains a suitable temperature responsive liquid and is connected by a fine bore tube 22 to a flexible bellows capsule (not shown) disposed within the housing of the thermostat 20. The operation of such a thermo-responsive device to open and close a pair of switch contacts TSC (FIG. 6) is well-known and will not be described in detail. The thermostat 20 has an adjusting knob 23 by which the operating temperature can be set at a desired value.

Surrounding the end portion of the temperature sensing tube 21 adjacent the thermostat 20 is a compensating heater coil 24, the purpose and connections of which will be described in greater detail hereinafter.

Located above and to one side of the thermostat 20 is a thermal cut-out switch 25 having a pair of thermal-responsive contacts TCC. The switch 25 is mounted in good thermal contact with the heat exchanger tube 8 and is operable to prevent energisation of the motor 17 until the tube 8 reaches a predetermined elevated temperature.

Figure 6:
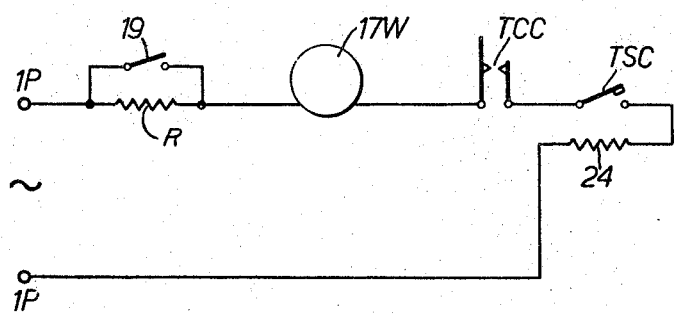
FIG. 6 is a schematic electrical circuit diagram of the heater.

The electric circuit of the heater is shown diagrammatically in FIG. 6. The circuit comprises a pair of A.C. power supply terminals IP between which are connected a series circuit comprising a motor speed control resistor R, shunted by the switch 19, the winding 17W of the motor 17, the contacts TCC of the thermal cut-out 25, the contacts TSC of the thermostat switch 20 and the heater coil 24 associated with the sensing element 21.

The heater operates as follows. Water heated by a suitable heating source, e.g. a solid fuel fired boiler, forming part of a central heating system, is circulated through the heat exchanger 8 and when the temperature of the heat exchanger is sufficiently elevated the contacts TCC of the termal cut-out also close. The thermostat control 23 also operates an A.C. supply switch (not shown) and when rotated to connect the A.C. supply to the heater, the fan motor 17 will be operated and the fan cylinders 9 rotated, provided that the thermostat contacts TSC are closed. Assuming that the contacts TSC are closed, rotation of the fan cylinders 9, causes air to be drawn in through the air intake 6, passing through the blades of the fan cylinders 9 and thence over the heat exchanger 8. The air thus heated then passes out of the heater through the outlet 4. When the air passing into the intake 6 reaches a temperature dependent on the setting of the thermostat-control switch 23, the contacts TSC open, cutting off the A.C. supply to the motor 17 so that forced air circulation through the heater ceases.

The thermostat sensing element 21 is disposed adjacent the air intake 6 but tends to take up a temperature higher than the ambient temperature of the space in which the heater is located, due to local radiation, convection and conduction from the heat exchanger 8. When the temperature in the region of the sensing element 21 falls sufficiently, the contacts TSC close again, reconnecting the A.C. supply to the motor 17 so that forced circulation of air through the heater recommences. The air passing through the air intake 6, being lower in temperature than the temperature of the sensing element 21, would in the absence of the heater 24, cool the sensing element 21 but closure of the contacts TSC also energises the heater coil 24 disposed around the sensing element 21. The heater coil 24 is so designed that when energised it offsets the temperature drop of the sensing element that would have taken place in the absence of the heater. When the temperature in the region of the sensing element 21 has risen sufficiently, the contacts TSC again open and cut off the A.C. supply to the motor 17 and to the heater 24.

Thus, the effects of the heater 24, when the fan motor 17 is operating, and those of local heating of the sensing element 21 by the heat exchanger 8 when the fan motor is not operating, are to maintain the local ambient temperature in the region of the sensing element at a sensibly constant value several degrees above the ambient temperature of the space being heated. Thus, by setting the thermostat 20 to operate at this higher, artificial, temperature, the temperature of the space can be maintained at the desired ambient temperature within the operating range of the thermostat. In the absence of the heater 24, as explained previously, the space temperature would tend to cycle over a range of temperatures substantially wider than the operating range of the thermostat.

The louvres 5 in the outlet 4 of the heater will be seen to be tilted upwards by a small angle. Using a plastics material an angle of about 10° to the horizontal has been found satisfactory. This uptilting ensures separation of the intake and outlet air streams of the heater in a very effective manner. The louvres 7 of the air intake 6 are downtilted in order to protect the fan blades from damage and to minimise turbulence at the front face of the heater.

A heater of the type illustrated can be constructed to have very compact dimensions yet provide a substantial heat output. In one construction, the overall dimensions of the housing 1 are approximately 24" x 9" x 5". The heat output, with a water circulation flow rate through the heat exchanger 8 of 1.5 gallons per minute and water temperature 100° F. above the space ambient temperature, is at least 10,000 B.t.u. per hour at a fan speed of 2,100 r.p.m. and at least 8,000 B.t.u. per hour at a fan speed of 1,300 r.p.m.

In a heater as described above, the thermostat heating coil 24 could be located alongside the sensing element 21, in proximity thereto, instead of surrounding it.

In addition, the heat exchanger 8 could be replaced by other suitable heating arrangements, e.g. electric heating elements.

What is claimed is:

1. An electric fan assisted heater having a housing with air intake and air outlet apertures defined therein, heat exchanger means disposed in said housing, an electric fan device disposed in said housing and operable to draw air into said housing through said air intake, to pass said air into heat exchange contact with said heat exchanger means and then discharge said air through said outlet aperture, a thermostatic switch device electrically connected to control operation of said fan device, said switch device having a temperature sensing element disposed in said housing adjacent said air intake aperture and being subject to thermal transmission from said heat exchanger means, an auxiliary heating device disposed in heat transfer relationship with said sensing element and electrically connected in circuit with said fan device and said switch device for energisation of said auxiliary heater device only when said fan device is operating, and in which said auxiliary heating element is adapted to supply to said sensing element a heat input equivalent to said thermal transmission from said heat exchanger means that takes place when said fan device is not operating, to provide for said switching device like reference temperatures both while said fan device is operating as well as when said fan device is not operating.

2. An electric fan assisted heater according to claim 1, wherein said housing has a front face containing said air intake and air outlet apertures, both said apertures being elongated and having adjacent lengthwise sides, and wherein said fan device is a transverse flow fan extending lengthwise of said apertures.

3. An electric fan assisted heater having a housing with air intake and air outlet apertures communicating with a space to be heated, heat exchanger means disposed in said housing, an electric fan device disposed in said housing and operable to draw air through said air intake aperture into said housing, to pass said air into heat exchange contact with said heat exchanger means and then discharge said air through said outlet aperture, a thermostatic switch device having a given operating differential electrically connected to control operation of said fan device, said switch device having a temperature sensing element disposed within said housing adjacent said air intake aperture and being subject to thermal transmission from said heat exchanger means whereby a given temperature rise is imparted to said sensing element when said fan device is not operating, auxiliary heater disposed in heat transfer relationship with said sensing element and electrically connected in circuit with said fan and said switch device for energisation of said auxiliary heater only during operation of said fan device, and in which said auxiliary heater is adapted to impart said given temperature rise to said sensing element when said fan is operating, said switching device being set to a temperature greater by said given temperature rise than a desired operating temperature whereby said fan assisted heater operates to maintain the temperature of said space within the operating differential of said switch device.

4. A heater according to claim 2, in which the housing contains intercommunicating compartments, one compartment containing the fan device and the other compartment containing the heat exchanger means, and in which the fan device and the heat exchanger means occupy the major available proportions of the said compartments.

5. A heater according to claim 2, in which the heat exchanger means comprises a liquid circulation, finned heat exchanger device.

6. A heater according to claim 2, in which the thermostatic switching device has an elongated temperature sensing element disposed lengthwise of the air intake aperture, and in which the auxiliary heater is a heater coil surrounding part of the sensing element.

References Cited
UNITED STATES PATENTS

| | | | |
|---|---|---|---|
| 2,235,500 | 3/1941 | Kitchen | 165—122 |
| 3,035,760 | 5/1962 | Simmons | 165—122 |
| 3,046,380 | 7/1962 | Carlson | 236—68 |
| 3,237,861 | 3/1966 | Parks et al. | 236—68 |

ROBERT A. O'LEARY, *Primary Examiner.*

CHARLES SUKALO, *Examiner.*